Patented Oct. 27, 1931

1,829,177

UNITED STATES PATENT OFFICE

VICTOR YNGVE, OF NIAGARA FALLS, NEW YORK, ASSIGNOR TO NATIONAL CARBON COMPANY, INC., A CORPORATION OF NEW YORK

ELECTROLYTE FOR ELECTROLYTIC CONDENSERS

No Drawing.    Application filed March 29, 1930. Serial No. 440,167.

This invention relates to electrolytic condensers which depend for their action upon the properties of the dielectric film which may be formed electrolytically upon the surface of aluminum or other so-called filming electrodes when the same are immersed in certain electrolytes and subjected to electric current. It has particular reference to a new and improved electrolyte for use in condensers of this nature commonly known as the "dry" type, in which the electrolyte is of non-liquid form.

The advantages of a non-liquid electrolyte over the older form of liquid electrolyte, especially for certain purposes, are well known. For proper use in condensers such electrolytes should be of a solid or semi-solid character, and should be capable of holding their form at ordinary summer temperatures. They should also be conductors of electric current, and should act to maintain the dielectric film upon the aluminum or other anode with which they may be used.

In accordance with my invention an electrolyte of non-liquid character is provided which has all of the above mentioned properties, and which acts to produce an improved condenser unit having a very rapid drop in initial leakage when placed in a circuit, and also a very low final leakage after being in circuit for a considerable length of time.

My electrolyte consists essentially of an emulsion of a wax-like substance such as paraffin which is prepared while the paraffin is in the molten state and which when cooled will set to a solid. Such emulsions may be easily prepared by thoroughly mixing molten paraffin with an aqueous solution or suspension of a suitable emulsifying agent.

Various gums such as acacia and tragacanth, or a gelatinous material like agar-agar either in an aqueous or non-aqueous solution will act to thoroughly emulsify molten paraffin. I may also use a soap solution as an emulsifying agent, said solution usually being considered as of a colloidal or semi-colloidal character. Suitable soaps are the ammonium, sodium, and potassium salts of stearic and oleic acid, or the alkyl amine salts of the same acids. Diethylamine oleate is especially suitable for this purpose.

Since the wax like material is emulsified in the disperse phase the resulting emulsion is a conductor of electric current, provided of course, that the emulsifying agent is capable of being ionized. When a gum or gelatinous material is used to emulsify paraffin it is necessary to also add an ionogen such as ammonium borate or diethylamine borate in an aqueous or non-aqueous solution. Diethylamine borate in a solvent of ethylene glycol, as disclosed in my copending application Serial Number 440,169, is especially suitable for this purpose. While a soap emulsifying agent will form a conducting emulsion suitable as an electrolyte without the addition of an ionogen, I nevertheless find it advantageous to have present in this instance also a boric acid salt. The ionogen should be added after the emulsification is complete and previous to cooling the mixture. A typical composition of an electrolyte as described would contain 80 parts of paraffin emulsified with 10 parts of a 12% solution of diethylamine oleate in water with an addition after emulsification is complete of 10 parts of an ethylene glycol solution of diethylamine borate.

The electrolyte of my invention may be employed in condensers in which any of the conventional types of assembly are used. In my copending application Serial Number 440,168 I have described various means of employing a gelatinized soap solution in a condenser assembly. The emulsified wax electrolyte may be used in the same manner.

For the wax-like base material paraffin is preferred although various other waxes are also suitable. As a means for controlling the rigidity of the emulsion the ratio of the base material to the other constituents may be varied considerably from the typical formula given without departing from the spirit of my invention as defined in the appended claims.

I claim:

1. An electrolyte for an electrolytic condenser comprising a wax-like base, an emulsifying agent, an ionogen, and a solvent for said ionogen.

2. An electrolyte for an electrolytic condenser comprising a wax-like base, an emulsifying agent, a boric acid salt, and a solvent for said salt.

3. An electrolyte for an electrolytic condenser comprising a wax-like base, an emulsifying agent, an aqueous vehicle for said emulsifying agent, and a solution of diethylamine borate in ethylene glycol.

4. An emulsified electrolyte for an electrolytic condenser comprising a wax-like base, and a soap solution as an emulsifying agent.

5. An emulsified electrolyte for an electrolytic condenser comprising a wax-like base, a soap solution, diethylamine borate, and a solvent for the diethylamine borate.

6. An emulsified electrolyte for an electrolytic condenser comprising a wax-like base, and an organic base soap as an emulsifying agent.

7. An emulsified electrolyte for an electrolytic condenser comprising paraffin and an alkyl amine soap as an emulsifying agent.

8. An electrolyte for an electrolytic condenser comprising paraffin, an aqueous soap solution, and diethylamine borate in an organic solvent.

9. An emulsified electrolyte for an electrolytic condenser comprising a wax-like base and diethylamine soap as an emulsifying agent.

10. An emulsified electrolyte for an electrolytic condenser comprising paraffin, and an aqueous solution of diethylamine oleate.

11. A composition of matter suitable for use as an electrolyte for electrolytic condensers comprising paraffin, a solution of diethylamine oleate in water, and a solution of diethylamine borate in ethylene glycol.

12. A composition of matter suitable for use as electrolyte in an electrolytic condenser comprising 80 parts of paraffin, 10 parts of a 12% solution of diethylamine oleate in water, and 10 parts of a solution of diethylamine borate in ethylene glycol.

In testimony whereof, I affix my signature.

VICTOR YNGVE.